United States Patent Office 3,470,142
Patented Sept. 30, 1969

3,470,142
TERPOLYMERS OF ETHYLENE, HIGHER ALPHA-OLEFINS AND CYCLOALKA-DIENONORBORNENES
Guido Sartori, Nazzareno Cameli, and Alberto Valvassori, Milan, Italy, assignors to Montecatini Edison S.p.A., Milan, Italy, a corporation of Italy
No Drawing. Filed Oct. 22, 1965, Ser. No. 502,358
Claims priority, application Italy, Nov. 23, 1964, 25,084/64
Int. Cl. C08f 15/40, 27/00
U.S. Cl. 260—79.5
24 Claims

ABSTRACT OF THE DISCLOSURE

According to the present invention, at least one cycloalkadienonorbornene is copolymerized with ethylene and at least one higher alpha-olefin, with or without the inclusion of dicyclopentadiene, in contact with anionic-type catalysts based on vanadium compounds, to obtain amorphous copolymers containing polymerized units of all of the starting monomers and which are sulfur-vulcanizable to useful elastomers or synthetic rubbers.

This invention relates to a new class of substantially linear, amorphous, vulcanizable, high molecular weight olefin copolymers and to a process for the preparation thereof with catalysts acting with a mechanism of the coordinated anionic type.

PRIOR ART

Earlier disclosures by the present applicants or their coworkers have described the preparation of linear amorphous, unsaturated copolymers obtained through copolymerization of one or more olefinic monomers selected from ethylene and higher alpha-olefins with conjugated, non-conjugated, linear or cyclic dienes or polyenes.

THE PRESENT INVENTION

It has now been found according to the present invention, that it is possible to prepare, by employing particular catalysts acting with a mechanism of the coordinated anionic type, a new class of amorphous, unsaturated copolymers capable of being vulcanized to elastomers having good mechanical characteristics. More particularly, it has been found that, by employing catalysts prepared from vanadium compounds and from metal organic compounds of aluminum or beryllium, it is possible to obtain linear, amorphous, high molecular weight copolymers of one or more monomers selected from cycloalkadieno derivatives of norbornene (bicyclo[2,2,1]heptene) with one or more monomers selected from ethylene and higher aliphatic alpha-olefins, said copolymers consisting of macromolecules containing unsaturations and formed of monomeric units deriving from each of the starting monomers.

It is known that either the monocyclic diolefins or the monoolefins containing a bicyclo[2,2,1]heptenic system can copolymerize with the alpha-olefins in the presence of catalystsacting with a mechanism of coordinated anionic type. It was to be expected, therefore, that in the cycloalkadienonorbornenes employed as comonomers according to the present invention, which contain double bonds of both types, these double bonds would participate in the copolymerization, simultaneously, thus giving cross-linked tridimensional products. On the contrary, we have found that, surprisingly, the copolymers which are the object of the present invention, are completely free of cross-links, as proved by their complete solubility in boiling n-heptane.

The trienes used to obtain the present copolymerizates are obtained by Diels-Adler reactions between cyclopentadiene and cyclic trienes. For instance, 5,6-cyclododecadieno-4',8'-norbornenes-2 are obtained by Diels-Adler reaction of cyclopentadiene and 1,5,9-cyclododecatrienes. Non-restrictive examples of trienes which may be employed according to the present invention are:

5,6-cyclononadieno-norbornenes-2
dimethyl-5,6-cyclodecadieno-norbornenes-2
5,6-cycloundecadieno-norbornenes-2

Instead of the monomers in the pure state, mixtures thereof with dicyclopentadiene may also be employed in the copolymerization. The latter monomer is employed as such or in the form of cyclopentadiene in the preparation of the trienes.

The olefins which may be employed in the preparation of the copolymers together with ethylene and cycloalkadienonorbornenes are the aliphatic alpha-olefins of the general formula R—CH=CH$_2$ wherein R is an alkyl group containing from 1 to 6 carbon atoms, more particularly propylene and butene-1.

By copolymerizing a mixture of the above said monomers, according to the present invention, such as for instance a mixture of ethylene, propylene and/or butene-1 and 5,6-cyclododecadieno-4',8'-norbornene-2, there is obtained a crude (total) copolymerization product which consists of macromolecules in each of which there are present randomly distributed polymerized units of ethylene, propylene and/or butene-1 and cyclododecadieno-norbornene. Each of the polymerized units deriving from the polymerization of the triolefin still contains two free unsaturations, which constitute reactive sites for subsequent reactions carried out on the copolymer. For instance, the sites of unsaturation along the macromolecular chain make it possible to vulcanize the copolymer with the aid of mixes similar to those commonly used for unsaturated rubbers. Also, the double bonds which are present in the macromolecules may for instance give rise, by means of oxidation with ozone, to polar groups such as for instance carbonyl groups, which may in turn constitute reactive groups useful for subsequent reactions and for improving the adhesivity of the copolymerizate.

The copolymers of the present invention can be defined as having a linear structure, that is as being substantially free of long branchings. This is proved by the fact that they have properties, such as in particular a viscous behavior, which are practically identical to those of known linear copolymers, such as, for instance of ethylene/alpha-olefin copolymers.

The copolymers of this invention have a molecular weight, higher than 20,000, determined viscosimetrically. They have in fact an intrinsic viscosity higher than 0.5, determined in tetralin at 135° C. or in toluene at 30° C. Their composition can be defined as homogeneous, as is proved by the easiness of obtaining well vulcanized products by employing the techniques normally used for the vulcanization of the unsaturated rubbers, preferably of those having a low unsaturation content, such as for instance butyl rubber. This proves also that the unsaturations are well distributed along the copolymer chain. The vulcanized products thus obtained are completely insoluble in the organic solvents, in particular in aliphatic hydrocarbons, and can be swollen only to a limited extent by some aromatic solvents. This is in sharp contrast to the copolymers as such, which are completely soluble in boiling n-heptane. The vulcanized products possess, moreover, a very good mechanical strength and low permanent elongations after break. Because of their good mechanical properties the elastomers obtained by vulcanizing these new copolymers may be used advantageously in all the fields in which natural and synthetic rubbers are employed, such as for instance in the preparation of pipes, tires, foils, elastic yarns, gaskets etc.

The copolymers may be extended or plasticized with hydrocarbon oils. Paraffinic or naphthenic oils are preferably used, although aromatic oils may also be used.

The catalytic systems which may be employed to prepare the copolymers of the present invention are highly dispersible, amorphous colloidally soluble, or completely soluble in the hydrocarbons which may be used as copolymerization medium such as aliphatic, cycloaliphatic and aromatic hydrocarbons, and are prepared from organometallic compounds of aluminum or beryllium and from vanadium compounds.

The organometallic compounds which may be employed in the preparation of the catalyst are preferably selected from the group consisting of beryllium dialkyls, beryllium alkylhalides, berrylium diaryls, aluminum trialkyls, aluminum dialkylmonohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, and complexes of the above said organometallic compounds with preferably weak Lewis bases.

Organometallic compounds in which the metal is bound by main valences not only to carbon and/or to halogen atoms but also to oxygen atoms bound to an organic group, such as e.g. aluminum dialkylalkoxides and aluminum alkylalkoxyhalides, may be also used.

Non-restrictive example of organometallic compounds which can be used include: beryllium dimethyl, beryllium methylchloride, beryllium diethyl, aluminum triethyl, aluminum triisobutyl, aluminum trihexyl, aluminum diethylmonochloride, aluminum diethylmonoiodide, aluminum diethylmonofluoride, aluminum diisobutylmonochloride, aluminum monoethyldichloride, aluminum ethylsesquichloride, aluminum butenyldiethyl, aluminum isohexenyldiethyl, 1-methyl-1, 4-di(diisobutylaluminum)butane, aluminum tri(dimethyl cyclopentylmethyl), aluminum triphenyl, aluminum tritolyl, aluminum di(cyclopentylmethyl) monochloride, aluminum diphenylmonochloride, aluminum diisobutylmonochloride complexed with anisole, aluminum monochloromonoethylmonoethoxide, aluminum diethylpropoxide, aluminum diethylamyloxide, aluminum monochloromonopropylmonopropoxide.

Vanadium compounds which are soluble in the hydrocarbons employed as polymerization medium are preferably used. Halides and oxyhalides (such as e.g. $VCl_4$, $VOCl_3$, $VBr_4$) are thus used as well as those compounds in which at least one of the metal valences is saturated to a heteroatom (in particular oxygen or nitrogen) bound to an organic group, such as, for instance, vanadium triacetylacetonate and tribenzoylacetonate, vanadyl diacetylacetonate, halogenacetylacetonates, trialcoholates and haloalcoholates, tetrahydrofuranates, etherates, aminates, pyridinates and quinolinates of vanadium tri- and tetrachloride and of vanadyl trichloride. Vanadium compounds which are insoluble in hydrocarbons, selected among organic salts such as, for instance, vanadium triacetate, tribenzoate and tristearate, may also be used.

In practice it has been found that in order to obtain the best results it is necessary to use catalytic systems containing halogen atoms, that is systems in which at least one of the catalyst-forming components contains at least one halogen atom.

The copolymerization may be carried out at temperatures comprised between $-80$ and $+125°$ C. When the catalysts used are prepared from vanadium triacetylacetonate or vanadyl diacetylacetonate or halogenacetylacetonates or, in general, from a vanadium compound in the presence of aluminum alkylhalides, in order to obtain high copolymer yields per weight unit of catalyst employed it is advisable to carry out both the catalyst preparation and the copolymerization at temperatures comprised between $0°$ C. and $-80°$ C., preferably between $-10$ and $-50°$ C. The activity of the mentioned catalysts is much higher, when operating under these conditions than when the same catalyst systems are prepared and used at higher temperatures. Moreover, by operating within the above-mentioned temperature range, the activity of the catalysts remains practically unchanged with time.

When catalysts are employed which are obtained from an aluminum alkylhalide and vanadium triacetylacetonate or vanadyl trialcoholates or haloalcoholates, at temperatures comprised between $0°$ C. and $125°$ C., in order to obtain high copolymer yields it is best to operate in the presence of particular complexing agents selected from ethers, thioethers, tertiary amines or trisubstituted phosphines containing at least one branched alkyl group or an aromatic nucleus. The complexing agent may be an ether of the formula RYR' wherein Y is oxygen or sulphur and R and R' represent a linear or branched alkyl group containing from 1 to 14 carbon atoms or an aromatic nucleus containing from 6 to 14 carbon atoms, at least one of R and R' being a branched alkyl group or an aromatic group.

The complexing agent may also be a tertiary amine of the formula:

wherein R, R' and R'' each represent an alkyl group containing from 1 to 14 carbon atoms or an aromatic nucleus containing from 6 to 14 carbon atoms, at least one of the Rs being an aromatic nucleus.

The complexing agent may also be a tertiary phosphine of the formula:

wherein R, R' and R'' each represent an alkyl group containing from 1 to 14 carbon atoms or an aromatic nucleus containing from 6 to 14 carbon atoms, at least one of the Rs being an aromatic nucleus.

The amount of the complexing agent used is preferably comprised between 0.05 and 1 mole per mole of aluminum alkylhalide.

The activity of the catalysts employed in the process herein described varies with the molar ratio of the compounds employed in the preparation of the catalyst.

According to the present invention, it has been found that by employing, for instance, aluminum trialkyls and vanadium halides or oxyhalides, it is convenient to use catalysts in which the ratio between the mols of aluminum trialkyl and the mols of the vanadium compound is comprised between 1 and 5, preferably between 2 and 4. On the contrary, when aluminum diethylmonochloride $[Al(C_2H_5)_2Cl]$ and vanadium triacetylacetonate ($VAc_3$) are used the best results are obtained with an $Al(C_2H_5)_2Cl/VAc_3$ molar ratio comprised between 2 and 20, preferably between 4 and 10.

The copolymerization may be carried out in an aliphatic, cycloaliphatic or aromatic hydrocarbon solvent consisting, for instance, of butane, pentane, n-heptane, cyclohexane, toluene, xylene or mixtures thereof.

Halogenated inert hydrocarbons may also be employed as solvents such as, for instance, chloroform, trichloroethylene, chlorobenzenes, tetrachloroethylene, methylene chloride, dichloroethane, etc. Particularly high copolymerization rates may be obtained if the copolymerization is carried out in the absence of an inert solvent, by employing the monomers themselves in the liquid state that is, for instance, in the presence of a solution of ethylene in the mixtures of aliphatic olefins and cycloalkadienonorbornenes to be copolymerized, maintained in the liquid state.

In order to obtain copolymers which are of homogeneous or substantially homogeneous composition, it is convenient to keep the ratio between the concentrations of the monomers to be copolymerized, present in the liquid phase, constant or at least as constant as is possible. To achieve this, it may be convenient to carry out the copolymerization in a continuous way by continuously feeding and discharging a monomer mixture having constant composition and by operating with high spatial rates.

By varying the composition of the monomer mixture one can vary the composition of the copolymers within wide limits.

In order to obtain amorphous copolymers of cycloalkadienonorbornenes with ethylene and propylene it is necessary to maintain an ethylene/propylene molar ratio in the reacting liquid phase lower than or at most equal to 1:4; which corresponds to a molar ratio between ethylene and propylene in the gaseous phase lower than or at most equal to 1:1, under normal conditions. Molar ratios of from 1:200 to 1:4 in the liquid phase are usually preferred. If butene-1 is employed instead of propylene, then in order to obtain copolymers which are amorphous on X-rays examination, the molor ratio between ethylene and butene in the liquid phase must be lower than or at most equal to 1:20, which corresponds to a molar ratio between ethylene and butene-1 in the gaseous phase lower than or at most equal to 1:1.5 under normal conditions. Molar ratios of ethylene to butene-1 in the liquid phase comprised between 1:1000 and 1:20 are usually preferred.

By operating under the aforementioned conditions, amorphous copolymers are obtained which contain less than about 75% by mols of ethylene. If these values are exceeded the copolymer shows a polyethylenic type crystallinity. The lower limit of the ethylene content is not critical; it is however preferred that the copolymers contain at least 5% by mols of ethylene. The alphaolefin content may preferably vary from a minimum value of 5% by mols to a maximum value of 95% by mols. The polyene content of the copolymer is preferably comprised between 0.1 and 20% by mols. This upper limit may be raised but, especially for economic reasons, it is not convenient to introduce into the copolymer a polyene content higher than 20% by mols.

The following examples are given to illustrate details of the invention without limiting its scope.

Example 1

The reaction apparatus is a glass cylinder having a capacity of 1200 cc. and a diameter of 7.5 cm. provided with a stirrer and gas inlet and outlet tubes. The gas inlet tube extends to the bottom of the apparatus bottom and terminates in a porous diaphragm (diameter 3.5 cm.). Into the apparatus, which is kept in a thermostatic bath at —20° C., 1050 cc. of anhydrous n-heptane and 1.5 cc. of 5, 6 cyclododecadieno-4′,8′-norbornene-2 are introduced. Through the gas inlet tube an ethylene-propylene mixture in the molar ratio 1:2 is introduced and circulated at the rate of 600 Nl/h. The catalyst is preformed in a 100 cc. flask, by operating at —20° C. under nitrogen atmosphere, and reacting in 60 cc. of anhydrous n-heptane 1.5 millimols of vanadium tetrachloride and 7.5 millimols of aluminum ethylsesquichloride [½Al$_2$(C$_2$H$_5$)$_3$Cl$_3$]. The catalyst thus preformed is siphoned into the reactor by means of nitrogen pressure. The ethylene-propylene mixture is continuously fed and discharged at the rate of 600 Nl/h.

After 30 minutes, the reaction is stopped by adding 10 cc. of methanol containing 0.1 g. of phenyl-beta-naphthylamine.

The product is purified in a separatory funnel under nitrogen atmosphere by means of repeated washings with aqueous hydrochloric acid and then with water and is finally coagulated in acetone. After vacuum drying there are obtained 17.3 g. of solid terpolymerizate which is amorphous on X-rays examination, looks like a non-vulcanized elastomer and is completely soluble in boiling n-heptane. The Mooney viscosity ML (1+4) at 100° C. is 22. Examination by means of infrared spectrography shows the presence of trans double bonds (band at 10.35 microns). The propylene content is 45% by weight.

100 parts by weight of the terpolymer are mixed on a laboratory roll mixer with 1 part phenyl-beta-naphthylamine, 2 parts of sulphur, 5 parts of zinc oxide, 50 parts of HAF black, 1 part of tetramethyl thiuram disulphide and 0.5 part of mercaptobenzothiazole. The mix is vulcanized in a press at 150° C. for 60 minutes. A vulcanized lamina having the following characteristics is obtained:

Tensile strength _____ kg./cm.$^2$ __ 208
Elongation at break _____ Percent __ 340
Modulus at 300% _____ kg./cm.$^2$ __ 182
Permanent set _____ Percent __ 8

Example 2

1050 cc. of anhydrous n-heptane and 1.5 cc. of 5,6 cyclododecadieno-4′,8′-norbornene-2 are introduced into reaction apparatus as described in Example 1, kept at —20° C. Through the gas inlet tube a gaseous ethylene-propylene mixture in the molar ratio 1:3 is introduced and circulated at the rate of 400 Nl/h. The catalyst is preformed in a 100 cc. flask, by operating at —20° C. under nitrogen atmosphere, and reacting 1.5 millimols of vanadium oxytrichloride and 7.5 millimols of aluminum ethylsesquichloride [½Al$_2$(C$_2$H$_5$)$_3$Cl$_3$]. The thus preformed catalyst is siphoned into the reactor by means of nitrogen pressure. The ethylene-propylene mixture is continuously fed and discharged at the rate of 400 Nl/h.

After 18 minutes the reaction is stopped by adding 10 cc. of methanol containing 0.1 g. of phenyl-beta-naphthylamine. The product is purified and isolated as described in Example 1. After vacuum drying, there are obtained 28. 4 g. of solid terpolymer which is amorphous on X-rays examination, looks like a non-vulcanized elastomer and is completely soluble in boiling n-heptane. Infrared spectrographic examination shows the presence of trans double bonds (band at 10.35 microns). The ethylene-propylene molar ratio is about 1:1. The Mooney viscosity ML (1+4) at 100° C. is 52.

The terpolymer is vulcanized with the same mix and the same modalities as in Example 1. A vulcanized lamina having following characteristics is obtained:

Tensile strength _____ kg./cm.$^2$ __ 232
Elongation at break _____ Percent __ 420
Modulus at 300% _____ kg./cm.$^2$ __ 149
Permanent set _____ Percent __ 10

Example 3

1050 cc. of anhydrous n-heptane and 1.5 cc. of 5,6-cyclododecadieno-4′,8′-norbornene-2 are introduced into reaction apparatus as described in Example 1, kept at —20° C. An ethylene-propylene mixture in the molar ratio 1:2 is introduced through the gas inlet tube and circulated at the rate of 450 Nl/h. The catalyst is preformed in a 100 cc. flask, by operating at —20° C. under nitrogen atmosphere and reacting 1 millimole of vanadium oxytrichloride and 5 millimols of aluminum ethylsesquichloride [½Al$_2$(C$_2$H$_5$)$_3$Cl$_3$] in 60 cc. of anhydrous n-heptane. The thus preformed catalyst is siphoned into the reactor under nitrogen atmosphere. The ethylene-propylene mixture is continuously fed and discharged at the rate of 450 Nl/h.

After 22 minutes, the reaction is stopped by adding 10 cc. of methanol containing 0.1 g. of phenyl-beta-naphthylamine. The product is purified and isolated as described in Example 1. After vacuum drying, there are obtained 32.6 g. of solid terpolymerizate which is amorphous on X-rays examination, looks like a non-vulcanized elastomer and is completely soluble in boiling n-heptane.

Infrared spectrographic examination shows the presence of trans double bonds (band at 10.35 microns) in this terpolymerizate. The ethylene-propylene molar ratio is about 1.2:1. The Mooney viscosity ML (1+4) at 100° C. is 130.

The terpolymer is vulcanized with the same mix and the same modalities of Example 1. A vulcanized lamina having following characteristics is obtained:

Tensile strength _____ kg./cm.$^2$__ 240
Elongation at break _____ percent__ 370
Modulus at 300% _____ kg./cm.$^2$__ 194
Permanent set _____ percent__ 8

Example 4

1050 cc. of anhydrous n-heptane and 1.5 cc. of 5,6-cyclododecadieno-4',8'-norbornene-2 are introduced into apparatus as described in Example 1, kept at −20° C. Through the gas inlet tube a gaseous ethylene-propylene mixture in the molar ratio 1:1.5 is introduced and circulated at the rate of 500 Nl/h. The catalyst is preformed in a 100 c. flask by reacting, in 60 cc. of anhydrous n-heptane, 1.5 millimols of vanadium oxytrichloride and 7.5 millimols of aluminum ethylsequichloride [½ Al$_2$(C$_2$H$_5$)$_3$Cl$_3$] by operating at −20° C. under nitrogen atmosphere. The thus preformed catalyst is siphoned into the reactor by means of nitrogen pressure. The ethylene-propylene mixture is continuously fed and discharged at the rate of 500 Nl/h.

After 8 minutes, the reaction is stopped by adding 10 cc. of methanol containing 0.1 g. of phenyl-beta-naphthylamine. The product is purified and isolated as described in Example 1. After vacuum drying, there are obtained 45.4 g. of solid terpolymerizate which is amorphous on X-rays examination, looks like a non-vulcanized elastomer and is completely soluble in boiling n-heptane.

Infrared spectrographic examination of this terpolymerizate shows the presence of trans double bonds (band at 10.35 microns). The ethylene-propylene molar ratio is about 1.5:1. The Mooney viscosity ML (1+4) at 100° C. is 94. The terpolymer is vulcanized with the same mix and the same modalities of Example 1, to obtain a vulcanized lamina having the following characteristics:

Tensile strength _____ kg./cm.$^2$__ 191
Elongation at break _____ percent__ 400
Modulus at 300% _____ kg./cm.$^2$__ 128
Permanent set _____ percent__ 12

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What is claimed is:

1. Substantially linear, amorphous, unsaturated, high molecular weight copolymers selected from the group consisting of (A) such copolymers of at least one cycloalkadienonorbornene with ethylene and least one aliphatic alpha-olefin of the general formula R—CH=CH$_2$, wherein R is an alkyl group containing from 1 to 6 carbon atoms, and (B) such copolymers of the monomers as recited under (A) plus dicyclopentadiene, said copolymers consisting of macromolecules containing unsaturations and formed by polymerized units of each of the starting monomers; and said copolymers containing, by mols, from 5% to about 75% of polymerized ethylene, from 5% to about 95% of polymerized alpha-olefin, and from 0.1% to about 20% of cycloalkadienonorbornene, the balance to 100% being made up, in the case of copolymers (B), of polymerized units of dicyclopentadiene.

2. Copolymers according to claim 1, consisting of macromolecules formed by polymerized units of ethylene, polymerized units of at least one aliphatic alpha-olefin of the general formula R—CH=CH$_2$, wherein R is an alkyl group containing from 1 to 6 carbon atoms, and polymerized units of 5,6-cyclododecadieno-4',8'-norbornene-2.

3. Copolymers according to claim 1, consisting of macromolecules formed by polymerized untis of ethylene, polymerized units of propylene, and polymerized units of 5,6-cyclododecadieno-4',8'-norbornene-2.

4. Process for the preparation of copolymers according to claim 1, characterized in that a mixture of the selected monomers is subjected to polymerizing conditions in contact with a catalyst obtained from:
 (a) vanadium compounds, and
 (b) organometallic compounds of a metal selected from the groups consisting of beryllium and aluminum.

5. Process according to claim 4, characterized in that at least one of the catalyst components contains at least one halogen atom.

6. Process according to claim 4, characterized in that the catalyst is obtained from vanadium compounds soluble in hydrocarbons.

7. Process according to claim 6, characterized in that the catalyst is obtained from hydrocarbon-soluble vanadium compounds selected from the group consisting of vanadium halides and oxyhalides and vanadium compounds in which at least one of the metal valences is saturated by a heteroatom, in particular oxygen or nitrogen, bound to an organic group.

8. Process according to claim 4, characterized in that the catalyst is obtained from hydrocarbon-insoluble vanadium compounds selected from the group consisting of vanadium triacetate, vanadium tribenzoate and vanadium tristearate.

9. Process according to claim 4, characterized in that the catalyst is obtained from an organometallic compound selected from the group consisting of aluminum trialkyls, aluminum dialkylmonohalides, aluminum monoalkyldihalides, aluminum alkylsequihalides, aluminum alkenyls, aluminum alkylenes, aluminum cycloalkyls, aluminum cycloalkylalkyls, aluminum aryls, aluminum alkylaryls, aluminum alkylalkoxides, aluminum alkylalkoxyhalides, complexes of said aluminum organic compounds with preferably weak Lewis bases, beryllium dialkyls, beryllium alkylhalides, and beryllium diaryls.

10. Process according to claim 4, characterized in that the catalyst is obtained from:
 (a) a halogenated vanadium compound and
 (b) an organometallic compound selected from the group consisting of halogenated and non-halogenated compounds of beryllium and aluminum.

11. Process according to claim 4, characterized in that the catalyst is obtained from:
 (a) a halogen free vanadium compound and
 (b) a halogen-containing organometallic compound of a metal selected from the group consisting of aluminum and beryllium.

12. Process according to claim 4, characterized in that the polymerization is carried out at temperatures comprised between −80 and 125° C.

13. Process according to claim 4, characterized in that the polymerization is carried out at temperatures comprised between 0 and −80° C., preferably between −10 and −50° C.

14. Process according to claim 4, characterized in that the catalyst used is obtained from a vanadium compound selected from the group consisting of vanadium triacetylacetonate, vanadyl trialcoholates, vanadyl halogen alcoholates and an aluminum alkylhalide, at temperatures comprised between 0 and 125° C. in the presence of a complexing agent selected from the group consisting of ethers, thioethers, tertiary amines and trisubstituted phosphines containing at least one branched alkyl group or an aromatic group, the amount of the complexing agent being comprised between 0.05 and 1 mole per mole of the aluminum alkylhalide.

15. Process according to claim 4, characterized in that the catalyst used is obtained from an aluminum trialkyl and a vanadium compound selected from the group consisting of the halides and oxyhalides and the molar ratio of aluminum trialkyl to vanadium compound is comprised between 1 and 5, preferably between 2 and 4.

16. Process according to claim 4, characterized in that the catalyst used is obtained from aluminum diethylmonochloride and vanadium triacetylacetonate and the molar ratio of aluminum diethylmonochloride to vanadium triacetylacetonitrile is comprised between 2 and 20, preferably between 4 and 10.

17. Process according to claim 4, characterized in that the polymerization is carried with the monomers in the liquid state, in the absence of an inert solvent.

18. Process according to claim 4, characterized in that the polymerization is carried out in an inert solvent selected from the group consisting of hydrocarbon solvents and halogenated hydrocarbon solvents.

19. Process for the preparation of a copolymer of at least one cycloalkadieneonorbornene with ethylene and propylene according to claim 4, characterized in that the molar ratio between ethylene and propylene maintained in the liquid phase is lower than or, at most, equal to 1:4.

20. Process for the preparation of a copolymer of at least one cycloalkadienonorbornene with ethylene and butene-1 according to claim 4, characterized in that the molar ratio between ethylene and butene-1 maintained in the liquid phase is lower than or, at most, equal to 1:20.

21. Elastomers obtained through sulfur vulcanization of the copolymers according to claim 1.

22. Copolymers according to claim 1, consisting of macromolecules formed by polymerized units of ethylene, polymerized units of at least one aliphatic alpha-olefin of the general formula R—CH=$CH_2$, wherein R is an alkyl group containing from 1 to 6 carbon atoms, polymerized units of 5,6 - cyclododecadieno-4′,8′-norbornene-2, the polymerized units of dicyclopentadiene.

23. Copolymers according to claim 1, consisting of polymerized units of ethylene, polymerized units of propylene, polymerized units of 5,6-cyclododecadieno-4′,8′-norbornene - 2, and polymerized units of dicyclopentadiene.

24. Manufactured articles made by shaping a mass comprising an elastomer according to claim 21.

References Cited
UNITED STATES PATENTS 3,418,299   12/1968   Benedikter _____ 260—85.3

JOSEPH L. SCHOFER, Primary Examiner

R. S. BENJAMIN, Assistant Examiner

U.S. Cl. X.R.

260—80.78, 88.2, 666

UNITED STATES PATENT OFFICE
CERTIFICATE OF CORRECTION

Patent No. USP 3,470,142           Dated September 30, 1969

Inventor(s) Guido Sartori et al

It is certified that error appears in the above-identified patent and that said Letters Patent are hereby corrected as shown below:

Col. 3, line 15, "berrylium" should be - - -beryllium- - -.

Col. 7, line 19 (Example 4) "100 c. flask" should be - - -100 cc flask- - line 21, "ethylsequichloride" should be - - -ethylsesquichloride- -

Col. 8, line 35 (Claim 9) "alkylsequihalides" should be - -alkylsesquihalides - -; and Col. 9, lines 7/8, (Claim 16) "triacetylacetonitrile" should be

- - -triacetylacetonate- - -;

line 11, (Claim 17) the word "out" should be inserted after

- - -carried- - -.

Col. 10, line 6      (Claim 22) "the" should be - - -and- - -

Signed and sealed this 2nd day of July 1974.

(SEAL)
Attest:

EDWARD M. FLETCHER, JR.          C. MARSHALL DANN
Attesting Officer                Commissioner of Patents